United States Patent [19]

Brennen et al.

[11] 4,398,141
[45] Aug. 9, 1983

[54] STATIC VAR GENERATORS

[75] Inventors: Michael B. Brennen, Wilkins Township, Allegheny County; Laszlo Gyugyi; Eric J. Stacey, both of Penn Hills Township, Allegheny County, all of Pa.

[73] Assignee: Westinghouse Electric Corp., Pittsburgh, Pa.

[21] Appl. No.: 303,299

[22] Filed: Sep. 15, 1981

[51] Int. Cl.³ .............................................. H02J 3/18
[52] U.S. Cl. ...................................... 323/211; 363/54
[58] Field of Search ....................... 323/209, 210, 211; 363/50, 52–54; 361/100–101

[56] References Cited

U.S. PATENT DOCUMENTS

| | | | |
|---|---|---|---|
| 3,999,117 | 12/1976 | Gyugyi et al. | 323/211 |
| 4,047,097 | 9/1977 | Gyugyi et al. | 323/211 |
| 4,063,301 | 12/1977 | Lye | 363/54 X |
| 4,104,576 | 8/1978 | Frank | 323/210 |
| 4,339,705 | 7/1982 | Kelley | 323/210 |

*Primary Examiner*—William M. Shoop
*Assistant Examiner*—Peter S. Wong
*Attorney, Agent, or Firm*—Benjamin Hudson, Jr.

[57] ABSTRACT

There is provided by this invention a static VAR generator having an auxiliary shutdown firing pulse generator that initiates a thyristor controlled inductive current to cancel only capacitive current supplied by the static VAR generator in the event of failure of the VAR generator's control means monitoring the capacitive current requirements.

3 Claims, 3 Drawing Figures

STATIC VAR GENERATORS

CROSS-REFERENCE TO RELATED APPLICATION

This application is related to the application Ser. No 302,349, filed Sept. 15, 1981.

BACKGROUND OF THE INVENTION

1. Field of the Invention:

This invention relates generally to static VAR generators and more particularly to static VAR generators having auxiliary shutdown firing generators for transient free isolation of the static VAR generator from the AC network in the event the VAR generator malfunctions.

2. Description of the Prior Art:

In order to ensure transient free shutdown capability, a full inductor current must always be maintained in the thyristor phase controlled inductor of the VAR generator during its shutdown. In the present VAR generator designs, the firing instance of the phase control pulses is derived from the power system's voltage in several stages. First, potential transformers supply input signals to a phase-lock type synchronous timing circuit. The synchronous timing circuit provides the necessary information for a thyristor phase angle control circuitry. Finally, the phase control determines the firing instance of the necessary full current phase control firing pulses. The phase control pulses obtained are transmitted from the phase control circuitry to a light emitting diode drive and protection circuitry. When a phase control pulse is received, the LED drive generates a light pulse that turns on the optically coupled firing circuits in the high voltage thyristor array of the phase controlled inductor. In order to obtain a full inductor current successfully, all of the above circuitry must be operational. One of the major concerns of both the supplier and the user of static VAR generators is the assurance of long life and reliable operation of the equipment. In some cases the shut down of the VAR generator, due to an internal failure, may require shutting down a complete system. One example of a transient free shutdown scheme is found in U.S. Pat. No. 4,047,097 entitled "Apparatus And Method For Transient Free Energization And Deenergization Of Static VAR Generators" assigned to the assignee of the present application.

The VAR generator power circuit basically consists of a fixed capacitor bank and a thyristor controlled inductor bank. When both the capacitor and the inductor banks are connected or switched across the AC voltage, the capacitor and inductor currents cancel each other out, therefore, the power line current supplied to the combined banks becomes practically zero. This zero current then can be interrupted in an easy, transient free manner by the main circuit breaker of the VAR generator during a normal VAR generator shutdown. If, at any time, during a shutdown the thyristor controlled inductor is inoperative, the main circuit breaker would have to interrupt capacitive discharge current with the possibility of the arc restriking in the circuit breaker and causing severe damage to the capacitor due to overvoltages. When the main circuit breaker is opened to deenergize a capacitor bank, the initial voltage across the breaker is zero. A half cycle later when the system voltage has reversed, and the capacitor voltage is still the same as when the breaker started opening, the voltage across the breaker is doubled. If the breaker restrikes on this double voltage, a high oscillatory current flows. The current is high because the voltage is doubled.

SUMMARY OF THE INVENTION

There is proposed by this invention an auxiliary shutdown firing pulse generator to maintain gate pulses that result in a maximum inductor current for the described transient free shutdown in the case of failure of the control circuitry of the VAR generator. In order to implement the desired auxiliary backup firing function, the gate pulses sent to the thyristor array are continuously monitored by the backup control circuitry. If any missing pulses are detected, a maximum current request is activated which generate gate pulses for the full inductor current necessary for limiting capacitive discharge current when disconnecting the VAR generator from the AC network. In order to increase the reliability of the auxiliary backup firing circuitry, shutdown pulses are derived by using only a minimal amount of sensing circuitry to indicate that sufficient firing energy is available for the firing of the thyristor array.

DESCRIPTION OF THE PREFERRED EMBODIMENT

Figure 1:
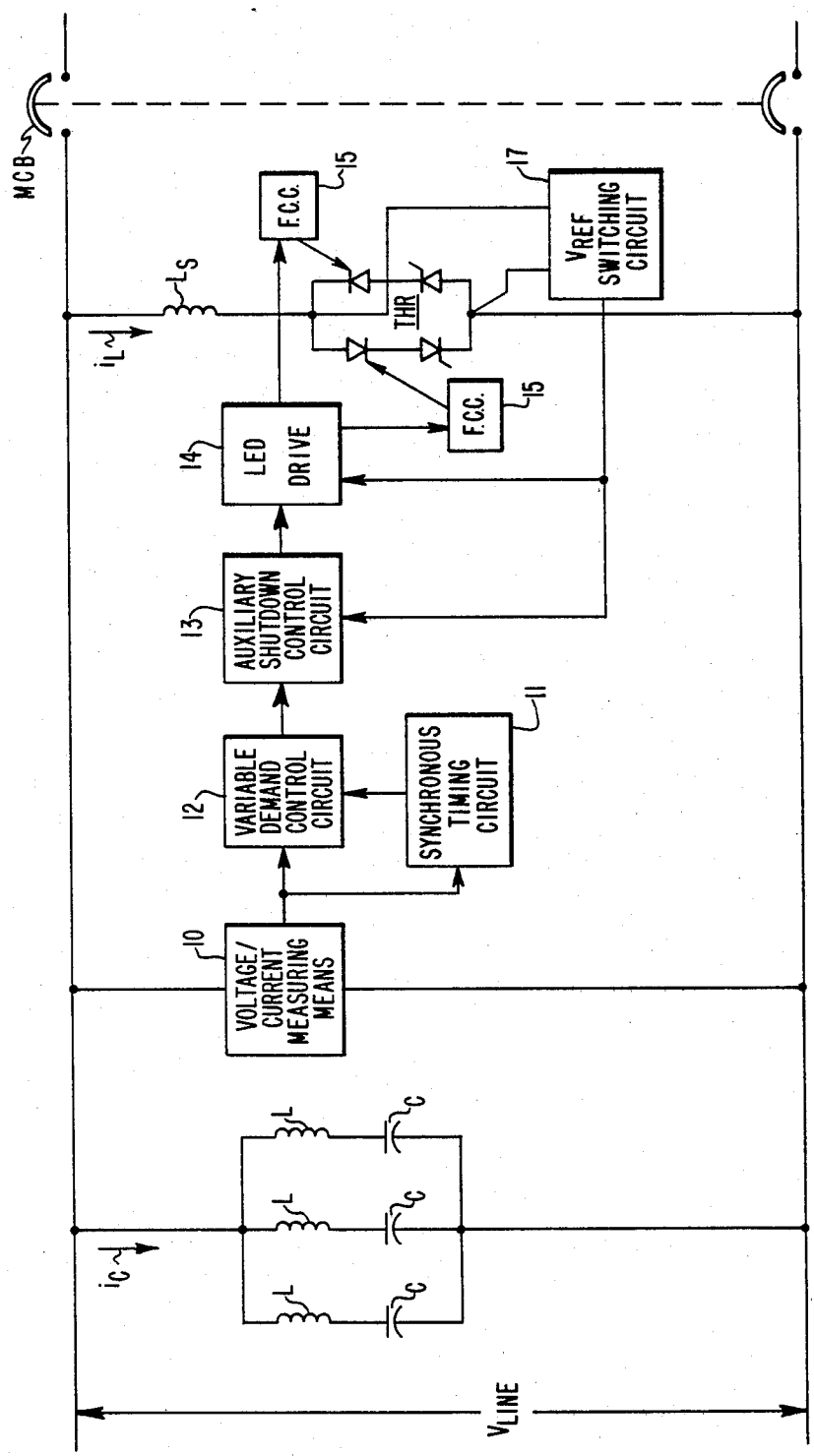
FIG. 1 is a block diagram illustrating a static VAR generator incorporating the principles of this invention.

Referring to FIG. 1 there is shown a static VAR generator incorporating the principles of this invention. Although only one phase is shown, this figure is typical of all three phases of a multi-phase system. There is shown a capacitor bank C with harmonic filters L connected across one phase of an AC network. A compensating inductance LS is connected to the system by means of an anti-parallel thyristor array THR. Also connected across the AC network is a voltage/current measuring means 10 for continuously monitoring and supplying a control signal representative of the AC network conditions. The signal VCM from the control circuitry 10 is supplied to a synchronous timing circuit 11 whose primary function is to provide proper timing waves to ensure that the thyrisitor controlled inductance LS is operated in synchronism with the AC network voltage. This synchronous timing circuit may be similar to that described in U.S. Pat. No. 3,999,117, entitled "Method And Control Apparatus For Static VAR Generator And Compensator" issued to L. Gyugyi and M. B. Brennen. The signal VCM from the voltage/current measuring means 10 is also inputted into a VAR demand control circuit 12 which analyzes the voltage and current information contained therein to determine the amount of inductive current that must be switched to compensate the network so as to keep its voltage variation within specified limits. Also inputted into the VAR demand control circuit 12 is a signal STC from the synchronous timing circuit 11 to ensure that all switching of inductive current is in synchronization with the AC network voltage. The signal VDC from the VAR demand control circuit 12 is inputted into an auxiliary shutdown control circuit 13 which will be described in more detail later. This control circuit 13 incorporates the principles of the present invention. The output signal ASC of auxiliary shutdown control circuit 13 is inputted into an LED drive module 14 which provides pulse amplification, sufficient to turn on a string of light emitting diodes, that are optically coupled to light sensitive gate firing circuits FCC 15 of the high voltage thyristor array. Sufficient energy must be stored within the firing circuits FCC so that upon receiving a signal from the LED drive modules the thyristors can be fired to switch in the predetermined amount of inductive current necessary to compensate the AC network. However, prior to initiating a firing pulse from the firing circuits FCC, a voltage reference switching circuit 17, monitors the amount of stored energy contained in the firing circuits available for the thyristor array and inputs a signal to the auxiliary shutdown circuit and the LED drive module that indicates that the energy available in the firing circuits is sufficient to ensure instantaneous firing of the thyristors when signaled. Main circuit breaker MCB is provided for connecting the static VAR generator into the AC network.

Figure 2:
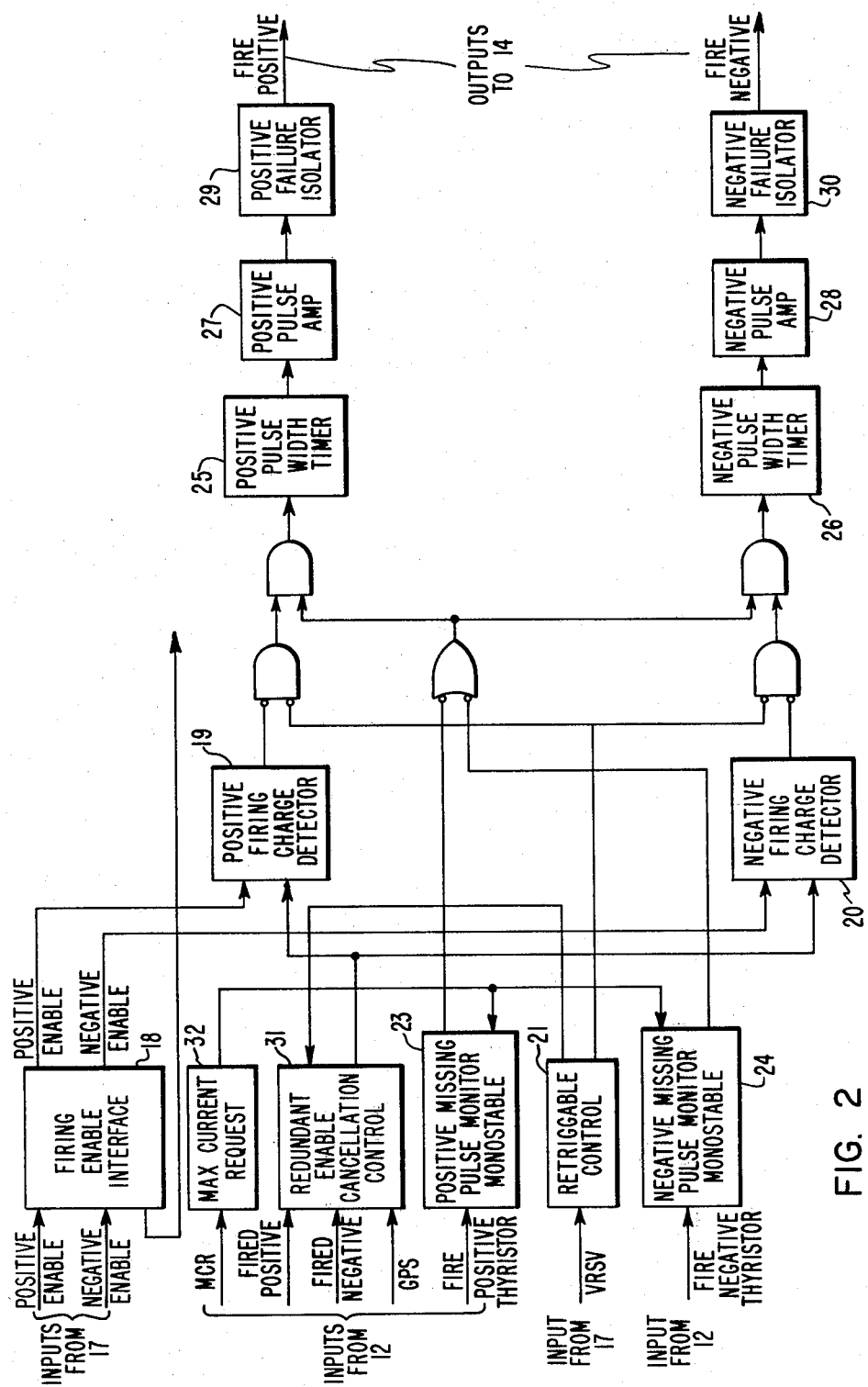
FIG. 2 is a basic circuit block diagram for the auxiliary shutdown firing pulse generator incorporating the principles of this invention.

Shown in FIG. 2 is a basic circuit block diagram for the auxiliary shutdown control circuit 13. The input from the voltage reference switching circuit 17, VRSC consists of a positive enable input and a negative enable inputs which are fed into a switch voltage firing enable interface 18 as shown. These inputs enable firing of the inductor thyristor switches at positive system voltage peaks and negative system voltage peaks, respectively. The input corresponding to firing during positive system voltage is fed to a positive firing enable circuit and the input for firing during negative system voltage is fed to a negative firing enable circuit. The positive and negative firing enabling circuits make a confirmation that individual thyristor firing circuits, FCC, are charged from the system voltage and that they are ready for simultaneous turn on of each thyristor in the respective thyristor array. Once it is confirmed that the firing circuits, FCC, are charged, the instant of firing, expressed in a "firing angle", $\alpha$, that is measured from each voltage peak across the thyristor controlled inductor, must be selected according to a known inverse, non-linear firing angle fundamental inductor current function. For the implementation of a full inductor current (conduction angle, $\phi = 180°$ for each half cycle) the firing pulse should ideally be issued at $\alpha = 0°$, that is exactly at the peak of the line to line voltage. Generally, in steady state, a firing pulse should not be issued before the voltage peak, because it has no effect when an already conducting thyristor is fired. A conducting thyristor would still turn off after the next inductor current zero crossing, irrespective of such a premature firing pulse. There is a transient case, however, when firing before the voltage peak results in a particular inductor current. If the thyristor controlled inductor operates with less than full (including zero) current, the thyristor is already turned off before the voltage peak. Since, when the thyristor is not conducting, a firing pulse will initiate conduction, the thyristor in this case can be turned on before a voltage peak. Depending on whether it was turned on before a positive or a negative peak, the resulting inductor current will carry a respective positive or negative DC component.

Figure 3:
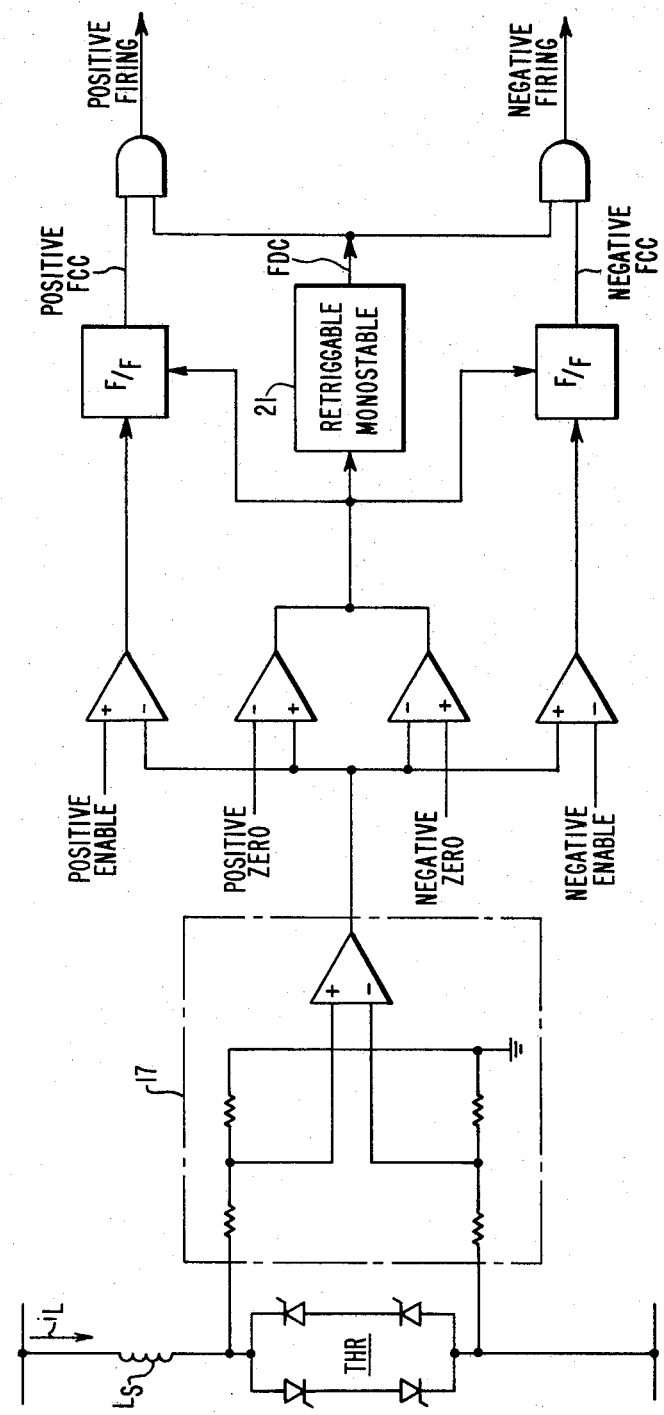
FIG. 3 illustrates a detailed schematic of the retrigerable control circuit 21 and the voltage reference switching circuit 17.

Each thyristor switch voltage is monitored by the voltage reference switching circuit 17, e.g. by differential high voltage attenuators and a differential amplifier DA as shown in FIG. 3. Two comparators are referenced to enable levels marked as the positive enable and the negative enable. The enable levels are set at approximately 50% of the nominal line to line voltage. When the thyristor voltage exceeds the enable reference valve, the comparator transmits an "Enabled" signal to the respective shutdown input. The positive and negative enable signals ENCN are one of the inputs to the respective positive and negative firing circuit charge detectors 19 and 20 (shown in FIG. 2). These detectors are latched on, after a delay, to be described hereinafter, by the ENCN signals. The latched detector provides the respective FCC signals indicated that the firing circuits are charged. Similarly, the zero crossings of the thyristor switch voltage are derived by the other two voltage comparators, referred to small value positive zero and negative zero voltage references (zero crossing detectors ZCD).

The proposed auto-symmetrical firing is achieved in the retriggerable control circuit 21 by triggering a retriggerable monostable, RM, whenever the switch voltage becomes zero, as indicated by the ZCD signal. The retriggerable monostable RM produces a firing delay signal FDC with a pulse width of $\pi - \Delta\alpha$ duration. $\pi$ is equal to one-half cycle and $\Delta\alpha$ is proportional to the remaining DC component in the inductor current. Therefore, $\Delta\alpha$ should be as small as possible for a safe, long term circuit design. The FCC signal is now gated by the firing delay control signal FCC as shown in each positive and negative channel.

As presented in FIG. 2, the transmittal of the FCC signal into a full current firing pulse inhibited (delayed) during the set time of the FDC. On the other hand, when the FDC times out and FCC is true, an auto-symmetrical firing pulse is generated.

Based upon the above principle, in its normal state, the auxiliary shutdown control circuit is in a full inductor current mode. When $\alpha$-controlled pulses are sent from the VAR demand control circuit 12, either fire positive thyristor or fire negative thyristor, they are detected by the separate positive and negative missing pulse monitor monostables 23 and 24. $\alpha$-controlled pulses are allowed to override the basic full current pulses via a full current/standby transfer logic gate is operated by the missing pulse monitors. When the auxiliary shutdown control circuit is in a standby mode, it stops issuing firing pulses by disabling the positive enable inputs into the positive firing enable circuit which indicates that the firing circuits FCC are charged. In order to prevent a weak firing pulse through short circuiting of an ongoing full current firing pulse by the standby transfer, monostable pulse width timers 25 and 26 are employed to ensure a constant uninterruptable firing pulse length delivered by the auxiliary shutdown control circuit. The pulse width timers 25 and 26 are followed by appropriate pulse amplifiers 27 and 28 and failure isolators 29 and 30, the latter to allow $\alpha$-control pulses in case of an auxiliary shutdown control circuit failure.

Referring again to FIG. 2, an external gate suppressed signal GPS, inhibits the shutdown gate pulses after the main circuit breaker MCB has opened, in order to terminate the self-oscillation of the capacitor reactor bank complex involved in a shutdown. Generally, the thyristor array's firing must be terminated before the array drops below a predetermined value. The approximate 50% voltage across the thyristor array is necessary to provide the necessary firing energy to the optically coupled individual thyristor firing circuits in the thyristor array that, themselves, obtain defined energy from the system voltage across the thyristor array. The gate pulse suppress signal GPS must be transmitted to the auxiliary shutdown control circuit in order to stop the full current firing pulses. The GPS signal is implemented by operating the charge detector which is reset via the redundant enable cancellation control 31.

Whenever the thyristor array is fired, the respective local firing circuits in the thyristor array lose their energy. Therefore, after each firing the FCC latches must be reset by either a fired signal, or the "thyristor switch voltage is zero" level of the ZCD. Reset by either the fired signals or the ZCD provides redundancy in case of the failure of the ZCD signal or the retriggerable control, RM.

An external maximum current request signal interface 32 is also shown in FIG. 2. This request during shutdown, overrides the $\alpha$-control pulses by resetting the missing pulse monitors. The shutdown pulse generation is then activated irrespective of the presence of $\alpha$-control pulses.

It can be readily seen that there is provided by this invention a novel auxiliary transient free shutdown firing pulse generator which provides full inductor current phase control firing pulses based only on thyristor switch voltage level sensors and appropriate fixed time delays, unless overridden by an external maximum current request or an external gate pulse suppression. This auxiliary shutdown means allows the main circuit breaker MCB to be opened at approximately zero current flow thus preventing the possibility of current restriking in the circuit breaker.

Although there has been illustrated and described a specific embodiment, it is clearly understood that the same were merely for purposes of illustration and that changes and modifications may readily be made therein by those skilled in the art without departing from the spirit and scope of this invention.

We claim as our invention:

1. A static VAR generator, comprising:

(a) a capacitive current means disposed for connection into an AC network;
    (b) a monitoring means connected to said AC network for monitoring the capacitive current requirement of the AC network;
    (c) a control means connected to said capacitive current means and said monitoring means for causing connecting of said capacitive current means into said AC network in response to the reactive requirements of said AC network;
    (d) switching means for connecting said capacitive current means into said AC network;
    (e) an auxiliary transient free shutdown means for allowing said switching means to disconnect said capacitive current means from the AC network without causing restriking transients in the event of failure of said monitoring means or said control means; and
    (f) surge suppression means for suppressing transients that may result from operation of said auxiliary transient free shut down means.

2. A static VAR generator as recited in claim 1 wherein said auxiliary transient free shutdown means is generally comprised of an auxiliary firing circuit disposed to determine a firing angle $\alpha$ for inserting a thyristor controlled inductive current means to cancel said capacitive current means in said AC network, said firing angle $\alpha$ being measured as a function of the voltage across said thyristor controlled inductive current means, and said auxiliary firing circuit further comprising positive and negative pulse monitoring means disposed to monitor the control signals of said control means and activate said auxiliary firing circuit in the event of failure of said control means controlling said capacitive current means in said AC network.

3. A static VAR generator as recited in claim 2 wherein said surge suppression means is generally comprised of a firing angle delay control having an output signal with a constant pulse width of $\pi - \Delta\alpha$ wherein $\Delta\alpha$ represents a firing angle delay necessary to minimize switching transients.

* * * * *